United States Patent [19]

Tueri

[11] Patent Number: 5,520,066
[45] Date of Patent: May 28, 1996

[54] MOTOR VEHICLE COMPRISING AN OPERATING DEVICE DISPOSED ON THE STEERING WHEEL

[75] Inventor: Julius Tueri, Leutenbach, Germany

[73] Assignee: Dr. Ing. h.c.F. Porsche AG, Weissach, Germany

[21] Appl. No.: 280,504

[22] Filed: Jul. 22, 1994

[30] Foreign Application Priority Data

Jul. 23, 1993 [DE] Germany .......................... 43 24 788.1
Mar. 5, 1994 [DE] Germany .......................... 44 07 429.8

[51] Int. Cl.$^6$ .............................. B60K 26/02; B60K 31/02
[52] U.S. Cl. ........................ 74/484 R; 200/61.57
[58] Field of Search ...................... 74/484 R; 200/61.54, 200/61.57, 61.88; 180/336

[56] References Cited

U.S. PATENT DOCUMENTS

| | | | |
|---|---|---|---|
| 3,544,743 | 12/1970 | Takei | 200/61.54 X |
| 4,701,629 | 10/1987 | Citroen | 200/61.54 X |
| 4,815,341 | 3/1989 | Ohkubo et al. | 477/134 |
| 5,335,743 | 8/1994 | Gillbrand et al. | 200/61.54 X |
| 5,365,803 | 11/1994 | Kelley et al. | 74/484 R |

FOREIGN PATENT DOCUMENTS

| | | |
|---|---|---|
| 0456511A3 | 11/1991 | European Pat. Off. . |
| WO92/06860 | 4/1992 | European Pat. Off. . |
| 0519528A3 | 12/1992 | European Pat. Off. . |
| 2936350 | 3/1981 | Germany .......................... 200/61.54 |
| 3941665 | 6/1991 | Germany . |
| 4005588 | 9/1991 | Germany . |
| 3184568 | 7/1988 | Japan .......................... 74/484 R |
| 4356272A | 12/1992 | Japan .......................... 74/484 R |

*Primary Examiner*—Rodney H. Bonck
*Assistant Examiner*—Troy E. Grabow
*Attorney, Agent, or Firm*—Evenson, McKeown, Edwards & Lenahan

[57] ABSTRACT

In the case of a motor vehicle comprising an operating device for the shifting of a power-shiftable transmission, the transmission can be automatically or manually shifted by way of a selector lever. The device comprises a finger-operated shifting rocker which is arranged in at least one steering wheel spoke, is held on a swivel shaft disposed in a housing and has an adjusting shifting element arranged between two electrical pressure switches. The shifting element comprises a lever which is connected with the housing and is arranged by means of its free end between operating surfaces of switches which are arranged coaxially with respect to one another. With respect to the housing, the shifting rocker can be swivelled about the shaft with a shifting travel in two directions.

31 Claims, 6 Drawing Sheets

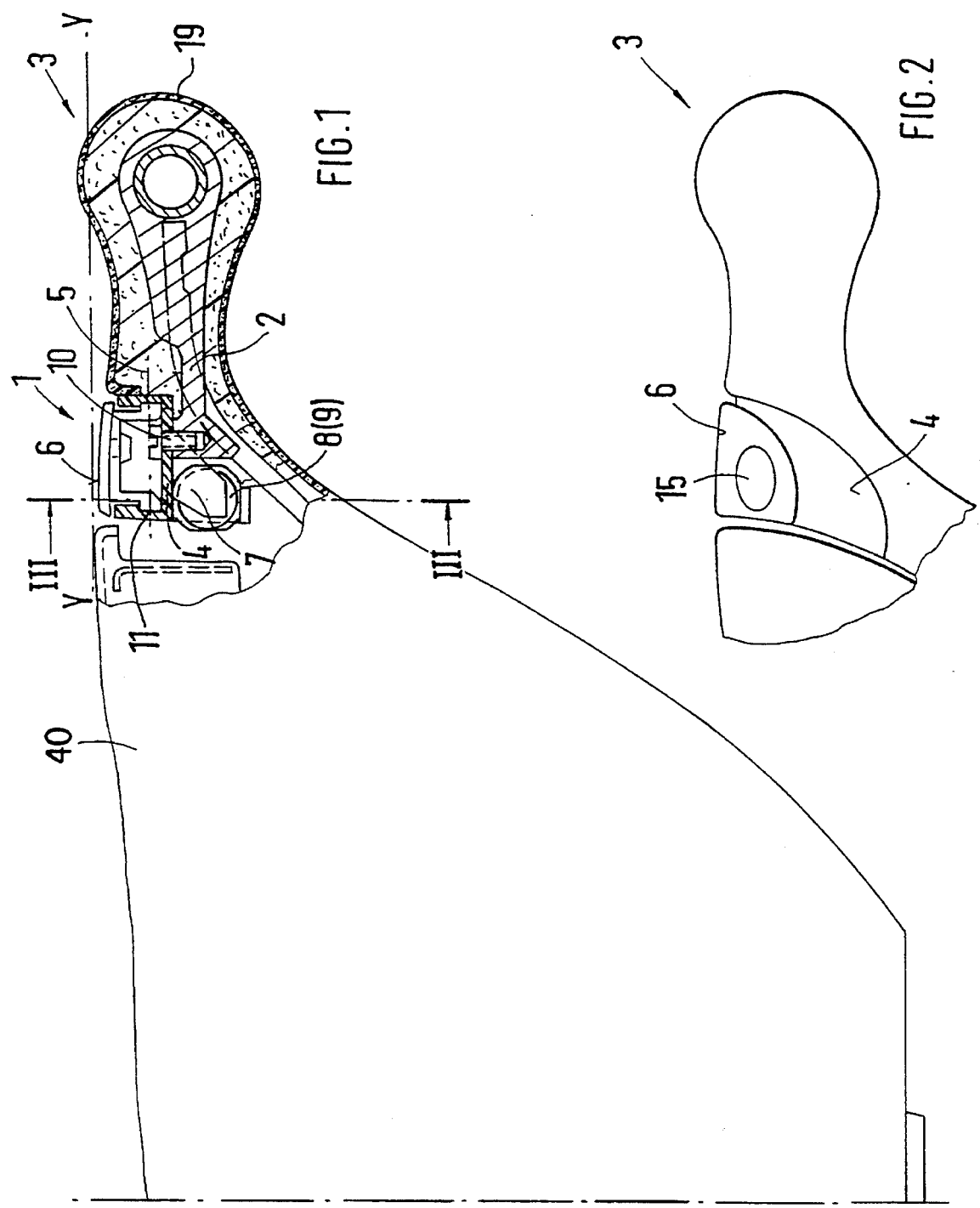

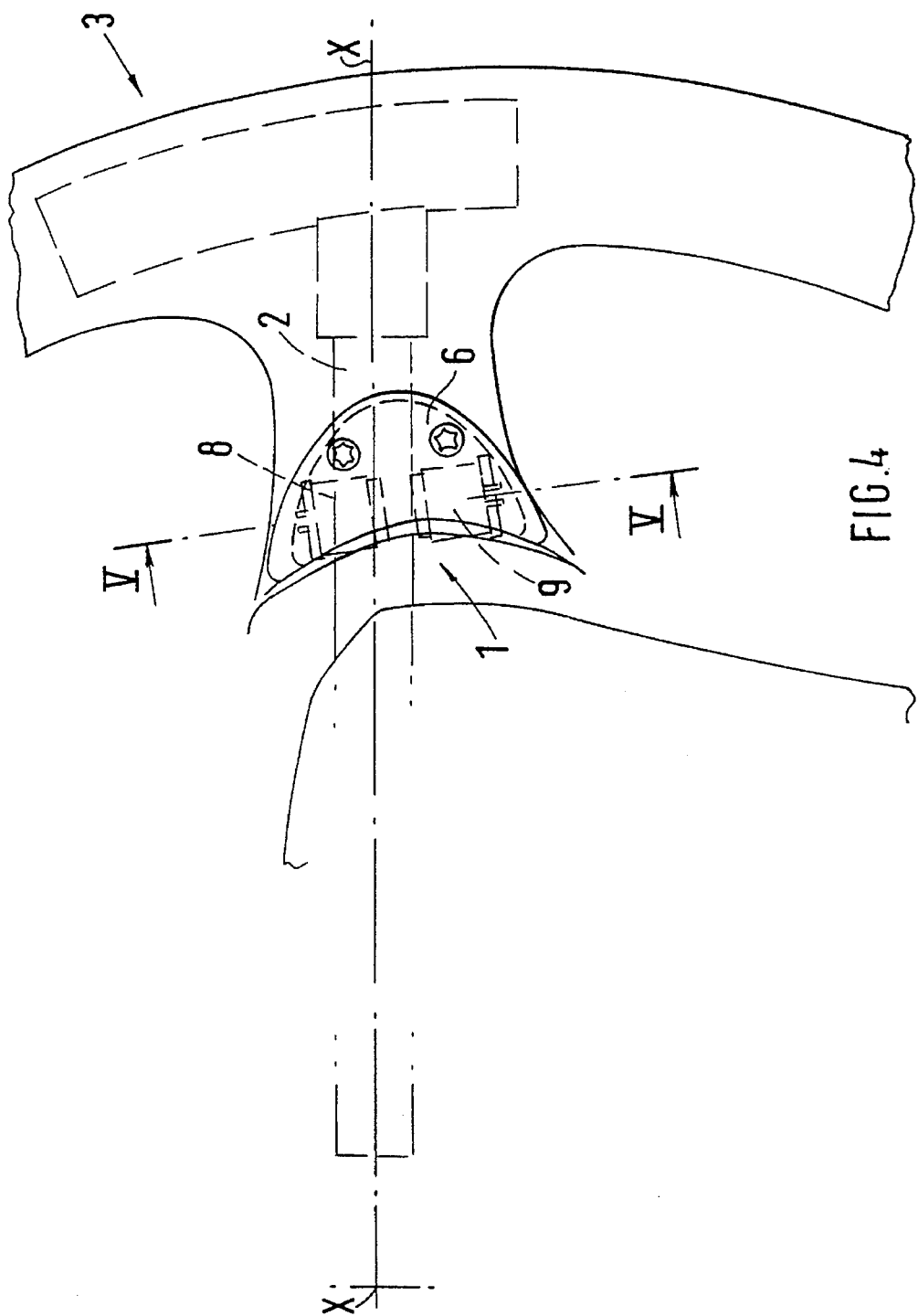

MOTOR VEHICLE COMPRISING AN OPERATING DEVICE DISPOSED ON THE STEERING WHEEL

BACKGROUND AND SUMMARY OF THE INVENTION

This invention relates to a motor vehicle comprising an operating device for the shifting of a power-shiftable transmission which is also automatically shiftable by a selector lever.

From German Patent Document DE-40 05 588 A1, a shifting mechanism for an automatic transmission is known which comprises a selector lever guided in at least one shifting channel. By means of this selector lever, various transmission speeds can be preselected in an automatic as well as in a manual shifting channel. The manual gearshift in this shifting channel comprises upshift and downshift positions which originate from a center position and can be shifted by means of touching. The automatic shifting takes place in the shifting channel which has the transmission shifting positions, such as the parking position, the reverse driving position and the forward shifting positions, which is caused by a corresponding shifting of the selector lever in this channel. For the shifting of the gears, a steering column switch is used. Furthermore, another construction is known which has a selector lever which is assigned directly to the shifting channels and can be operated in the manner of a rocker-type switch, and the transmission gears can be shifted manually by touching into the upshift and downshift positions.

Also, from German Patent Document DE-39 41 665 A1, a motor vehicle comprising an automatic transmission is known in which operating elements for a gear selection and/or a program selection are arranged at the steering wheel. These operating elements consist of directly controllable pressure switches by means of which the individual gears of the automatic transmission can be prompted.

It is an object of the invention to provide an operating device for a manual and/or automatic shifting of a power-shiftable transmission by means of which a manual shifting of the transmission can be carried out from the steering wheel within easy reach and the mechanism consists of a compact constructional unit which is integrated into the steering wheel.

According to the invention, this object is achieved by an arrangement wherein the operating device comprises a finger-operated shifting rocker which is arranged in at least one steering wheel spoke, is held on a swivel shaft disposed in a housing and has an adjusting shifting element arranged between two electrical pressure switches.

The principal advantages achieved by means of the invention are that a power-shiftable transmission can be automatically shifted selectively by way of a selector lever assigned to the shifting channels but a manual gear selection can also be carried out. In addition, the manual shifting is to be carried out instead of via the selector lever in the area of the shifting channels also by way of an easily reachable operating device which is assigned to the steering wheel when the selector lever is in a manual shifting channel.

The operating device consists essentially of a shifting rocker which is connected with the steering wheel spoke. It is arranged adjacent to the steering wheel rim in such a manner that an adjusting movement of the shifting rocker can be carried out by the fingers of the driver's operating hand without having to let go of the steering wheel.

For this purpose, the shifting rocker has on its operating surface at least one corresponding indentation as well as at least one elevation which permits in a simple manner a feeling by and positioning of the finger for the swivelling of the shifting rocker.

The operating device comprises the shifting rocker which is swivellably disposed on a housing, in which case the housing is fastened to the steering wheel spoke by means of a screwed connection. The constructional unit of the shifting rocker and the housing are constructed such that it forms a part of the steering wheel spoke which has an approximately circular cross-section.

In its interior, the shifting rocker has a lever which is constructed as a shifting element and which acts by means of its free end on two pressure switches which interact with an electrical control device of the driving system.

For operating the pressure switches, which are preferably disposed coaxially with the interposed lever in the housing, the shifting rocker is swivelled about the shaft to two sides or directions by pressure by way of a finger of the driver's operating hand. The swivel path is at the same time the shifting travel for the pressure switches.

The housing comprises a component which is easy to manufacture, which receives the two pressure switches between walls and which forms the bearing sites for the swivel shaft of the shifting rocker.

The operating device is constructed such that the outer surface forms a flush outer surface with the contour of a cushioning of the steering wheel spoke.

The highest elevation of this outer surface is situated approximately in the outer plane formed by the steering wheel rim and a steering wheel baffle plate. Preferably, the indentation and the elevation for operating the shifting rocker are arranged behind one another transversely with respect to the transverse axis of the steering wheel and are situated approximately behind and in front of the highest elevation of the outer surface of the shifting rocker. The shifting rocker may be arranged on two sides of the steering-wheel rim in the spokes so that it can be operated by the left and/or by the right operating hand.

Because of its compactness, the constructional unit can easily be retrofitted in conventional steering wheels.

The principal advantages achieved by means of the invention are that, because of the construction of the shifting rocker of the operating device with two indentations in the outer surface which are arranged behind one another, a good haptic arrangement of the shifting finger of the driver's operating hand is ensured. In practice, it was found during a comparison between two indentations in the shifting rocker and one indentation and one elevation in the shifting rocker that the variant with two indentations can be operated much more easily.

It is also an advantage of the invention that the web between the two indentations, which are constructed as so-called finger depressions, is constructed as a transverse web which may have a convex curvature in the transverse direction. A transverse web of this type is not only used as a separation between the two indentations but may also be used for operating the shifting positions of the transmission and for downshifting the gear positions of the transmission. This has proven to be advantageous in that the finger of the driver's operating hand which is situated in the upper indentation for the purpose of upshifting does not take the path to the indentation which is situated farther away for the purpose of downshifting but the transverse web is felt as the replacement for the lower indentation. In order to achieve an optimal stroke for the downshift for the operating finger, the transverse web may be slightly curved in the transverse direction of the shifting rocker.

In the case of a four-spoke steering wheel, the shifting rocker with the two indentations may preferably be arranged in all four steering wheel spokes so that, also in the event of cornering, particularly during continued cornering, the driver's operating hand can always be assigned to a shifting rocker.

Other objects, advantages and novel features of the present invention will become apparent from the following detailed description of the invention when considered in conjunction with the accompanying drawings.

BRIEF DESCRIPTION OF TEE DRAWINGS

FIG. 1 is a sectional view of a steering wheel for a motor vehicle in an area of an operating device constructed according to a preferred embodiment of the invention;

FIG. 2 is a view of the operating device of FIG. 1;

FIG. 4 is a top view of the steering wheel with the operating device of FIG. 1;

FIG. 5 is a sectional view taken along Line V—V of FIG. 4;

DETAILED DESCRIPTION OF THE PREFERRED EMBODIMENTS

Figure 3:
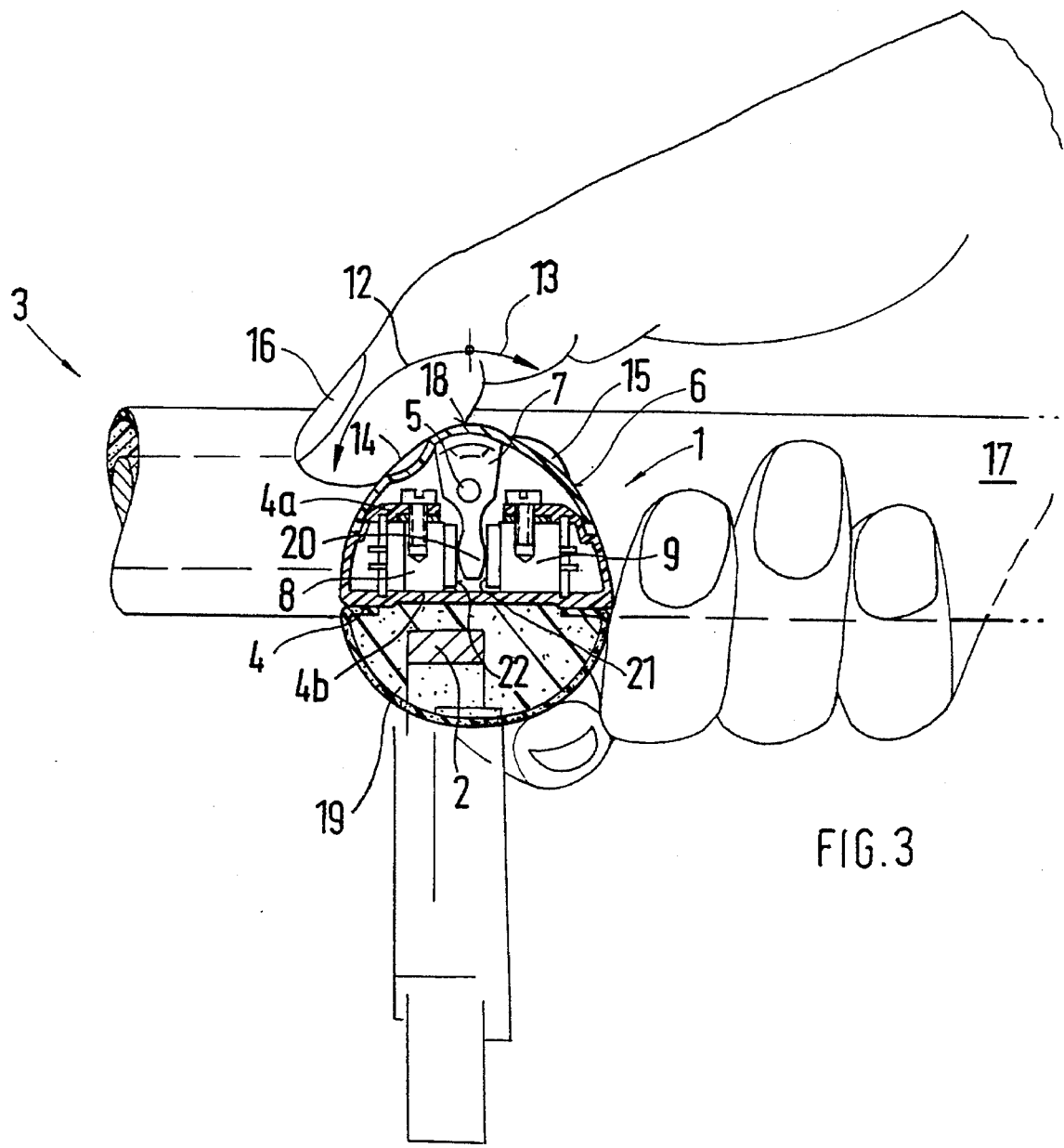
FIG. 3 is a sectional view taken along Line III—III of FIG. 1, and including a depiction of a driver's hand during operation of the operating device.
Figure 6:
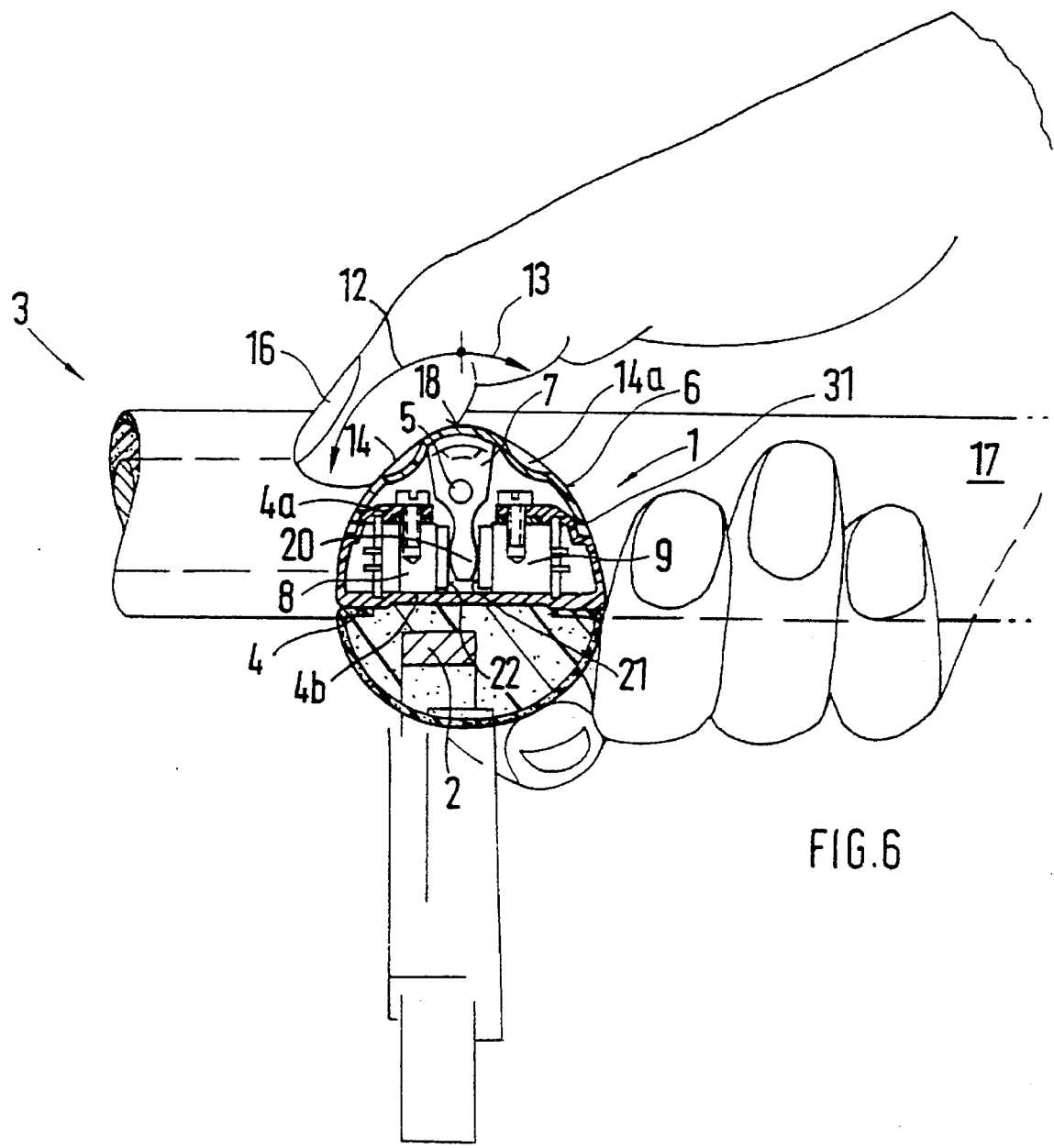
FIG. 6 is a part sectional schematic view of the installed condition of a construction of a shifting rocker of an operating device constructed according to another preferred embodiment of the invention.
Figure 7:
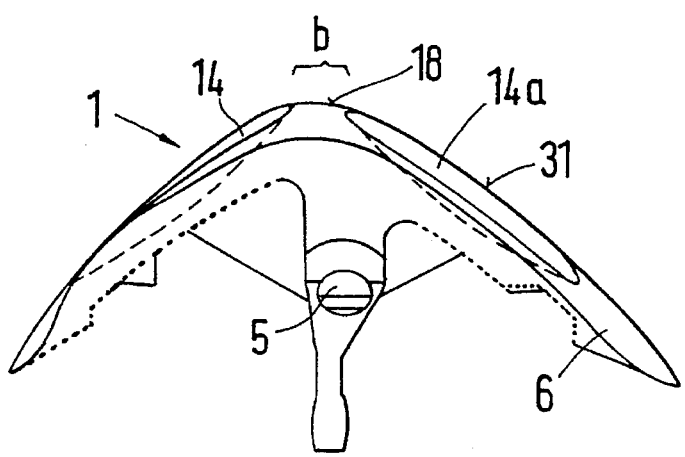
FIG. 7 is a frontal view of the shifting rocker of the operating device of FIG. 6.
Figure 8:
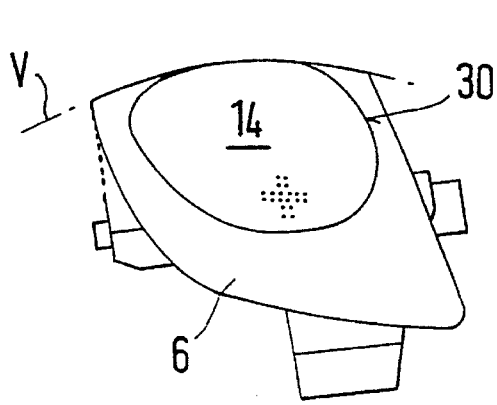
FIGS. 8 and 9 are views of the indentations of the operating device of FIG. 6.
Figure 9:
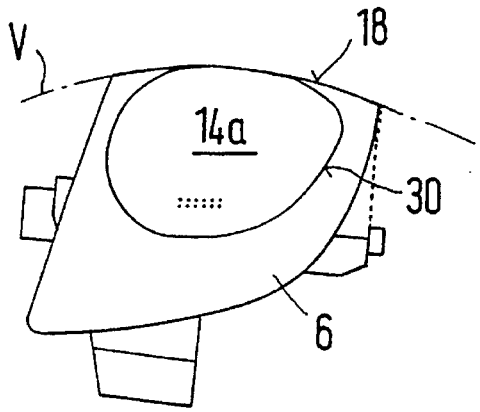
Figure 10:
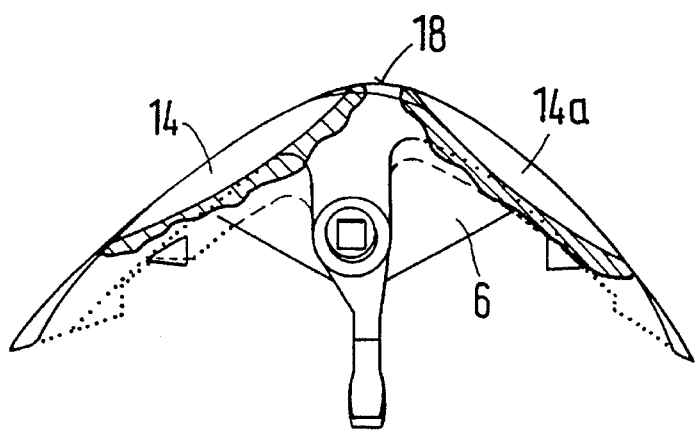
FIG. 10 is a sectional view of the shifting rocker with a view of the two indentations of the operating device of FIG. 6.

The operating device 1 is held on a spoke 2 of a steering wheel 3 and comprises essentially a housing 4 which is connected with spoke 2, a shifting rocker 6 which can be swivelled around a shaft 5, a shifting element 7, and pressure switches 8 and 9.

The housing 4 is formed by a shell with upper wall portions 4a and a lower wall portion 4b which is connected with the spoke 2 by means of screws 10. By way of bearings 11 in the housing 4, the shifting rocker 6 is held so that it can be swivelled about the shaft 5 to two sides in the direction of the arrows 12 and 13 with respect to the housing 4. A lever, which is called a shifting element 7, is arranged on the interior side together with the shifting rocker 6. This lever takes up a position between the two pressure switches 8 and 9 which are arranged coaxially with respect to one another. These pressure switches 8 and 9 are held between the wall portions 4a and 4b of the housing 4 and are additionally fastened by means of screws.

For the operation, the shifting rocker 6 has on its outer surface at least one indentation 14 and one elevation 15 for the positioning of a finger 16 of the driver's operating hand 17. These fixed operating points 14 and 15 are arranged to be situated behind one another perpendicularly to the transverse axis X—X of the steering wheel.

The elevation 15 is arranged in the form of a lenticular cam, for example, in front of the swivel shaft 5, and the indentation 14 is arranged, for example, behind the swivel shaft 5, the terms "behind and in front" of the swivel shaft referring to the driving direction of the vehicle.

The shifting rocker 6 has a curved outer surface whose highest elevation 18 is situated approximately in the plane Y—Y formed by the steering wheel rim 19 and by a steering wheel baffle plate 40.

An operating of the shifting rocker 6 for the manual shifting of a transmission takes place, for example, by exercising pressure on the indentation 14 by means of finger (thumb) 12. As a result, the shifting rocker 6 swivels about the shaft 5 in the direction of the arrow 12, in which case the free end 20 of the lever 7 acts upon an operating surface 21 of the pressure switch 9 and, for example, an upshift operation is triggered. Correspondingly, as a result of pressure exercised on the elevation 15 by means of finger 12, the shifting rocker 6 is swivelled in the direction of the arrow 13, in which case the operating surface 22 of pressure switch 8 is acted upon and, for example, a downshift operation takes place. In all these operations, a selector lever for the shifting of a transmission is arranged in a manual shifting channel.

A further embodiment is illustrated in FIGS. 6–10, wherein similar drawing reference numerals are used as in FIGS. 1–5 to identify similar parts. Reference should be made to the description of FIGS. 1–5 for those parts not specifically described below.

According to another embodiment of the invention corresponding to FIGS. 6 to 10, the shifting rocker 6 has on its outer surface two indentations 14 and 14a for positioning a finger 16 of the driver's operating hand 17 for the operation. These fixed operating points 14 and 14a are arranged behind one another perpendicularly to the transverse axis of the steering wheel.

The shifting rocker 4 preferably has a curved outer surface whose highest elevation 18 is situated approximately in the plane formed by the steering wheel rim and a steering wheel baffle plate.

An operating of the shifting rocker 6 for the manual shifting of a transmission takes place, for example, by exercising pressure on the indentation 14 by means of the finger 16. As a result, the shifting rocker 6 swivels about the shaft 5 in the direction of the arrow 12, in which case the free end 20 of the lever 7 acts upon an operating surface 21 of the pressure switch 9 and, for example, an upshift operation is triggered. Correspondingly, by means of pressure on the additional indentation 14a by means of the finger 12, the shifting rocker 6 is swivelled in the direction of the arrow 13, in which case the operating surface 22 of the pressure switch 8 is acted upon and, for example, a downshift operation takes place. In all these operations, a selector lever for shifting a transmission is arranged in a manual shifting channel.

The indentations 14, 14a are constructed in the form of finger depressions and have a boundary wall 30.

Figure 11:
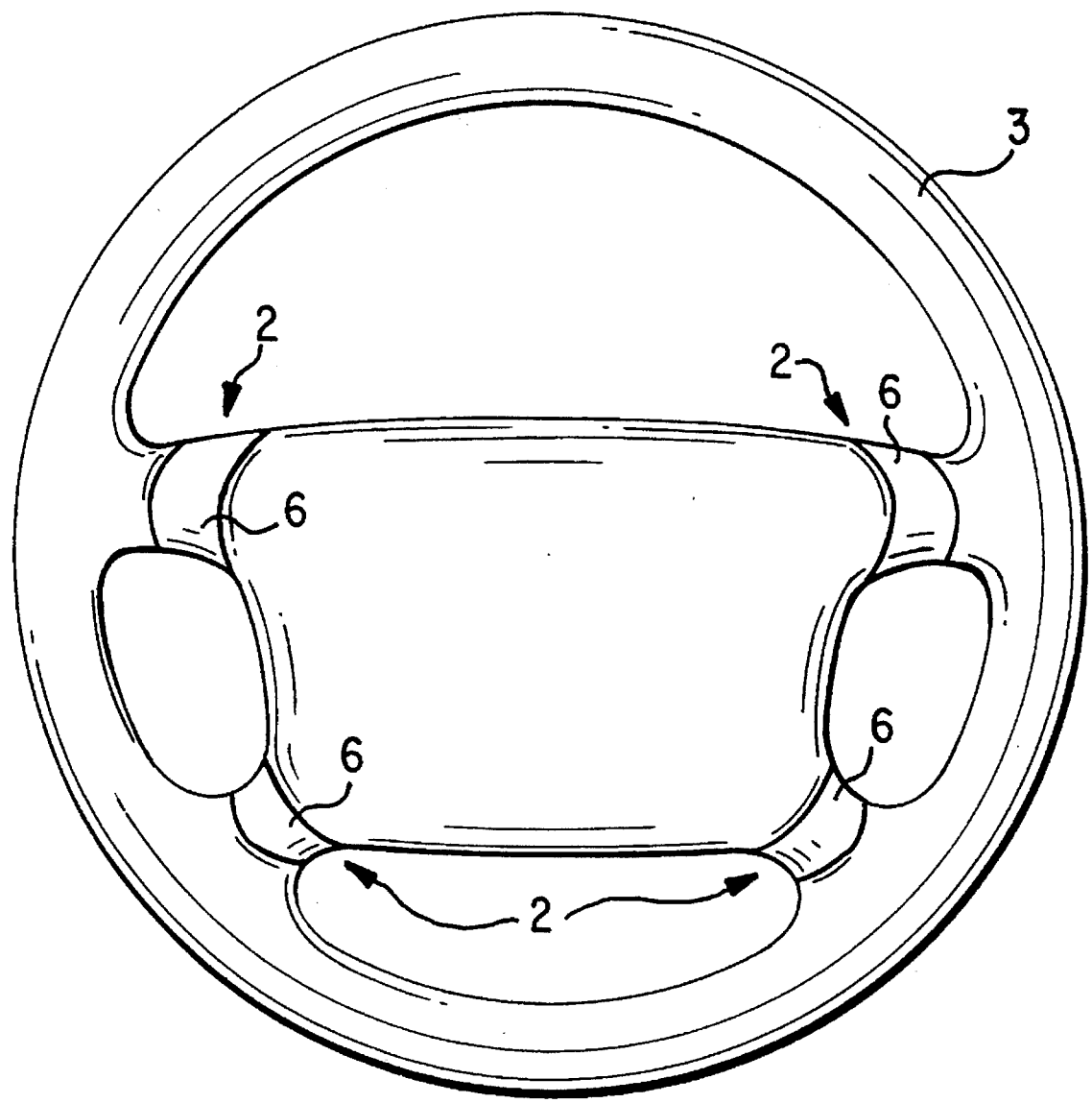
FIG. 11 is a schematic perspective view of a further embodiment of the invention.

Between the two indentations 14, 14a, a transverse web 18 is arranged which is constructed as an elevation 18. This transverse web is disposed flush in the surface contour 31 of the shifting rocker 6 and has a convex curved course V in the transverse direction. The transverse web 18 is designed to be relatively narrow with a width b so that the path between the indentations 14, 14a is short. Advantageously the shifting rocker 6 can be arranged in each rib when the spokes 2 of the steering wheel 3 are arranged correspondingly FIG. 11 schematically illustrates a four-spoke known steering wheel configuration with the only improvement being a shifting rocker 6 arranged in all four spokes 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An operating device for the manual shifting of a power-shiftable transmission of a motor vehicle, the transmission being automatically or manually shiftable also by way of a selector lever, wherein the operating device comprises a finger-operated shifting rocker which is arranged in at least one steering wheel spoke, is held on a swivel shaft disposed in a housing and has an adjusting shifting element arranged between two electrical pressure switches;
said shifting rocker having movable gripping surfaces arranged in line for pivoting said adjusting shifting element over a shifting travel in an opposite direction to the movement of the gripping surfaces.

2. An operating device according to claim 1, wherein the shifting element comprises a lever which is connected with the housing and which is arranged by means of its free end between operating surfaces of said switches which are arranged coaxially with respect to one another.

3. An operating device according to claim 2, wherein the shifting rocker can be swivelled with respect to the housing about the swivel shaft with a shifting travel in two directions.

4. An operating device according to claim 3, wherein the housing is connected with a steering wheel spoke which holds the pressure switches between housing wall portions, the housing being arranged between the shifting rocker and the steering wheel spoke surrounded by spoke cushioning.

5. An operating device according to claim 4, wherein an outer wall of the housing exhibits a flush outer surface with an outer wall shell of the shifting rocker as well as the contour of the spoke cushioning.

6. An operating device according to claim 5, wherein the shifting rocker has on its finger-operated surface at least one indentation and one elevation forming the gripping surfaces for operating the shifting rocker.

7. An operating device according to claim 6, wherein the indentation and the elevation are arranged in line perpendicularly with respect to a transverse axis of a steering wheel on a rounded outer surface of the shifting rocker.

8. An operating device according to claim 7, wherein the indentation is arranged on one side of the swivel shaft and the elevation is arranged on the other side of the swivel shaft.

9. An operating device according to claim 8, wherein a highest elevation of a rounded surface of the shifting rocker extends approximately in a plane formed by a top surface of a steering wheel rim and a steering wheel baffle plate.

10. An operating device according to claim 1, wherein the shifting rocker has on its finger-operated surface at least one indentation and one elevation forming the gripping surfaces for operating the shifting rocker.

11. An operating device according to claim 10, wherein the indentation and the elevation are arranged in line perpendicularly with respect to a transverse axis of a steering wheel on a rounded outer surface of the shifting rocker.

12. An operating device according to claim 11, wherein the indentation is arranged on one side of the swivel shaft and the elevation is arranged on the other side of the swivel shaft.

13. An operating device according to claim 1, wherein the shifting rocker has in its outer surface indentations in the form of finger depressions forming the gripping surfaces which are arranged in line perpendicularly with respect to a transverse axis of the steering wheel.

14. An operating device according to claim 13, wherein a relatively narrow transverse web extends between the two indentations which, in addition to the indentation is constructed as finger-operable shifting element for the downshift of gear positions of the transmission.

15. An operating device according to claim 14, wherein the transverse web is constructed to be convexly curved in the transverse direction of the steering wheel and has a highest elevation in a longitudinal center axis of the shifting rocker.

16. An operating device according to claim 1, wherein the housing is connected with a steering wheel spoke which holds the pressure switches between housing wall portions, the housing being arranged between the shifting rocker and the steering wheel spoke surrounded by spoke cushioning.

17. An operating device according to claim 16, wherein an outer wall of the housing exhibits a flush outer surface with an outer wall shell of the shifting rocker as well as the contour of the spoke cushioning.

18. An operating device according to claim 1, wherein the shifting rocker can be swivelled with respect to the housing about the swivel shaft with a shifting travel in two directions.

19. An operating device according to claim 1, wherein a highest elevation of a rounded surface of the shifting rocker extends approximately in a plane formed by a top surface of a steering wheel rim and a steering wheel baffle plate.

20. An operating device according to claim 1, wherein four steering wheel smokes are provided, said shifting rocker being arranged in each spoke.

21. An operating device for the shifting of a power-shiftable transmission of a motor vehicle, the transmission being automatically or manually shiftable also by way of a selector lever, and the device comprising a finger-operated shifting rocker which is arranged in at least one steering wheel spoke, is held on a swivel shaft disposed in a housing and has an adjusting shifting element which is arranged between two electrical pressure switches, wherein the shifting rocker has in its outer surface indentations in the form of finger depressions which are arranged in line perpendicularly with respect to a transverse axis of the steering wheel, said indentations of said shifting rocker being movably arranged for pivoting said adjusting shifting element over a shifting travel in an opposite direction to the movement of the indentations.

22. An operating device for the manual shifting of a power-shiftable transmission of a motor vehicle, the transmission being automatically or manually shiftable also by way of a selector lever, wherein the operating device comprises a finger-operated shifting rocker which is arranged in at least one steering wheel spoke, is held on a swivel shaft disposed in a housing and has an adjusting shifting element arranged between two electrical pressure switches;
wherein the housing is connected with a steering wheel spoke which holds the pressure switches between housing wall portions, the housing being arranged between the shifting rocker and the steering wheel spoke surrounded by spoke cushioning; and
wherein an outer wall of the housing exhibits a flush outer surface with an outer wall shell of the shifting rocker as well as the contour of the spoke cushioning.

23. An operating device according to claim 22, wherein the shifting rocker has on its finger-operated surface at least one indentation and one elevation for operating the shifting rocker.

24. An operating device according to claim 25, wherein the indentation and the elevation are arranged in line perpendicularly with respect to a transverse axis of a steering wheel on a rounded outer surface of the shifting rocker.

25. An operating device according to claim 24, wherein the indentation is arranged on one side of the swivel shaft and the elevation is arranged on the other side of the swivel shaft.

26. An operating device according to claim 22, wherein the shifting rocker has in its outer surface indentations in the form of finger depressions which are arranged in line perpendicularly with respect to a transverse axis of the steering wheel.

27. An operating device according to claim 26, wherein a relatively narrow transverse web extends between the two indentations which, in addition to the indentations, is constructed as a finger-operable shifting element for the downshift of gear positions of the transmission.

28. An operating device according to claim 27, wherein the transverse web is constructed to be convexly curved in the transverse direction of the steering wheel and has a highest elevation in a longitudinal center axis of the shifting rocker.

29. An operating device according to claim 22, wherein the shifting element comprises a lever which is connected with the housing and which is arranged by means of its free end between operating surfaces of said switches which are arranged coaxially with respect to one another.

30. An operating device according to claim 22, wherein the shifting rocker can be swivelled with respect to the housing about the swivel shaft with a shifting travel in two directions.

31. An operating device according to claim 22, wherein a highest elevation of a rounded surface of the shifting rocker extends approximately in a plane formed by a top surface of a steering wheel rim and a steering wheel baffle plate.

\* \* \* \* \*